United States Patent
Richter et al.

(10) Patent No.: US 7,730,072 B2
(45) Date of Patent: *Jun. 1, 2010

(54) AUTOMATED ADAPTIVE CLASSIFICATION SYSTEM FOR KNOWLEDGE NETWORKS

(75) Inventors: James Neal Richter, Bozeman, MT (US); Douglas K. Warner, Bozeman, MT (US); Ganesh Prabu, Bozeman, MT (US)

(73) Assignee: Rightnow Technologies, Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/751,934

(22) Filed: Dec. 29, 2000

(65) Prior Publication Data

US 2001/0044791 A1    Nov. 22, 2001

Related U.S. Application Data

(63) Continuation-in-part of application No. 09/549,568, filed on Apr. 14, 2000, now Pat. No. 6,842,748.

(51) Int. Cl.
G06F 7/00 (2006.01)
G06F 17/00 (2006.01)
G06F 17/30 (2006.01)

(52) U.S. Cl. .................. 707/748; 707/749; 707/750; 707/751

(58) Field of Classification Search ............ 706/11, 706/45, 52; 707/3, 501–514.103 R, 104.1, 707/10, 1; 709/201, 203–223
See application file for complete search history.

(56) References Cited

U.S. PATENT DOCUMENTS 5,630,125 A * 5/1997 Zellweger .............. 395/614
5,933,818 A * 8/1999 Kasravi et al. ............... 706/12
5,933,822 A    8/1999 Braden-Harder et al. ....... 707/5
5,940,821 A * 8/1999 Wical ......................... 707/3
6,021,403 A * 2/2000 Horvitz et al. .............. 706/45
6,085,226 A    7/2000 Horvitz ..................... 709/203
6,105,044 A * 8/2000 DeRose et al. ............. 707/514
6,327,574 B1   12/2001 Kramer et al. ............... 705/14

OTHER PUBLICATIONS

U.S. Patent No. 5,630,125 was specified by applicant's IDS filed on May 13, 2002.*

* cited by examiner

Primary Examiner—Apu M Mofiz
Assistant Examiner—Susan Y Chen
(74) Attorney, Agent, or Firm—Husch Blackwell Sanders LLP

(57) ABSTRACT

A method and apparatus for use in an information retrieval system is provided, which derives related informational items that have a usage based relationship strength, and which results in an efficient and more accurate dynamic relationship association between informational items. This system comprises the steps for detecting a selection of at least a first informational item and a second informational item in an information retrieval session. A relationship type is assigned based on characteristic similarities between the first informational item and the second informational item. Additionally, a relationship strength is assigned based on historical frequency of the consecutive selection of the first and second informational items and providing an access to the second informational item upon detection of the first being accessed by a user of the information retrieval system. Also, in accordance with the principles of the present invention, the extraction of textual database fields; the application of multiple text classification algorithms; the merging of the algorithm results; the encoding of the merged results as a Bayesian-type link; the use of feedback methods to weight, prune and age the relationship link serves to automate and enhance the process of classification in an information retrieval system.

22 Claims, 10 Drawing Sheets

| Informational Item | Related Informational Item | Relationship Type | Relationship Strength |
|---|---|---|---|
| Info. Item 1 | Info. Item A | General | STR 1 |
| | Info. Item B | CHAR 1 | STR 3 |
| | Info. Item C | CHAR 2 | STR 9 |
| Info. Item 2 | Info. Item D | General | STR 4 |
| | Info. Item X | CHAR 1 | STR 15 |
| | Info. Item C | CHAR 2 | STR 3 |
| | Info. Item D | CHAR 3 | STR 7 |
| | Info. Item A | CHAR 3 | STR 2 |
| . | . | . | . |
| Info. Item N | Info. Item X | General | STR 1 |
| | Info. Item Y | CHAR 1 | STR m |
| | Info. Item Z | CHAR 2 | STR n |

FIG. 2.

| Informational Item | Related Informational Item | Relationship Type | Relationship Strength |
|---|---|---|---|
| Rose | Fire truck | Red | 4 |
| | Fire truck | General | 4 |
| | Daisy | Flower | 10 |
| | Daisy | Scent | 5 |
| | Daisy | General | 18 |
| | Shakespeare | Name | 2 |
| | Shakespeare | General | 3 |
| . | . | . | . |
| Info. Item N | Info. Item X | General | STR l |
| | Info. Item Y | CHAR 1 | STR m |
| | Info. Item Z | CHAR 2 | STR n |

FIG. 2A.

| Informational Item | Related Informational Item | Relationship Type | Relationship Strength |
|---|---|---|---|
| Rose | Fire truck | Red | 4 |
| | Fire truck | General | 4 |
| | Daisy | Flower | 11 |
| | Daisy | Scent | 6 |
| | Daisy | General | 19 |
| | Shakespeare | Name | 2 |
| | Shakespeare | General | 3 |
| . | . | . | . |
| Info. Item N | Info. Item X | General | STR 1 |
| | Info. Item Y | CHAR 1 | STR m |
| | Info. Item Z | CHAR 2 | STR n |

FIG. 2B.

| Informational Item | Related Informational Item | Relationship Type | Relationship Strength |
|---|---|---|---|
| Info. Item 1 | Info. Item A | General | STR 1 |
| | Info. Item B | CHAR 1 | STR 3 |
| | Info. Item C | CHAR 2 | STR 9 |
| . | . | . | . |
| Info. Item N | Info. Item X | General | STR 1 |
| | Info. Item Y | CHAR 1 | STR m |
| | Info. Item Z | CHAR 2 | STR n |
| Item LOC 1 | Info. Item D | HELP | STR 4 |
| | Info. Item E | HELP | STR 6 |
| | Info. Item F | HELP | STR 9 |
| . | . | . | . |
| Item LOC N | Info. Item Q | HELP | STR 1 |
| | Info. Item R | HELP | STR m |
| | Info. Item S | HELP | STR n |

FIG. 5.

AUTOMATED ADAPTIVE CLASSIFICATION SYSTEM FOR KNOWLEDGE NETWORKS

RELATED APPLICATION

The present application is a continuation in part of an application for U.S. Letters Patent, entitled "Usage Based Strength Between Related Information In an Information Retrieval System" by the present inventors, assigned to the assignee of the present application, having Ser. No. 09/549,568 Apr. 14, 2000 now U.S. Pat. No. 6,842,748.

TECHNICAL FIELD

The present invention generally relates to information search and retrieval systems. More particularly, the present invention relates to automation of classifying related informational items during an information retrieval session to enhance the performance and efficiency of an information retrieval system.

BACKGROUND ART

A database is useful only if a desired item can be efficiently found and retrieved therefrom. To locate and retrieve a desired information item in an information database, a search of the database, e.g., based on a keyword or a text string, may be required. The search typically involves finding entries matching the keyword (or string) in an index created from parsing the information items into searchable words and the location in which the word appears in the database. For example, the Internet, or the world wide web (WWW), may be considered as a very large database of information items, in the form of web pages, distributed over a very wide network. Currently available search engines, e.g., the YAHOO™, EXCITE®, and the like, maintain an index of a large fraction of the content of the WWW parsed into searchable words and corresponding locations, e.g., the Uniform Resource Locators (URL).

However, as the size of a database becomes very large e.g., the number of web pages in the WWW is currently in the hundreds of millions, and growing fast, a user may have to navigate through, select and review a significant number of informational items before arriving at the one desired informational item. The navigation through the ever-increasing number of informational items is often proved difficult, and requires a considerable investment of time, effort, and sometimes even good fortune, on the part of the user.

Unfortunately, in a conventional information retrieval system, even after finding the sought after information once, to find the same information again, unless the user remembers the location of the information, the user may have to follow the same navigational trail, again spending the required considerable investment of time and effort. Moreover, a subsequent user looking for the same information would have to duplicate the time and effort, i.e., must re-invent the wheel, in order to find the information. The subsequent user often ends an information retrieval session in frustration without finding the desired information. This duplicated effort is wasteful and inconvenient, and thus diminishes the usefulness of the database.

Moreover, in a conventional help information retrieval system, the help information items are fixedly mapped, requiring a user to always follow the same help menu path to arrive at a particular help item of interest. Even if the path is ultimately proven to be inefficient, the inefficient path, nevertheless, must always be followed in order to retrieve that particular item. The efficiency of a particular path to be taken may depend on the context in which the help item is sought. Because the fixed mapping cannot account for the various contexts, it is inefficient, and thus diminishes the usefulness of the help information retrieval system.

Thus, what is needed is an efficient system and method for the convenient and economical retrieval of a desired informational item in an informational retrieval system that allows leveraging of the time and effort invested during prior information retrieval sessions.

What is also needed is an automated classification system for textual databases where an innovative method is employed to enhance the accuracy and efficiency of the system.

SUMMARY OF INVENTION

Generally, a system of the present invention utilizes a method and apparatus for use in an information retrieval system that provides related informational items that have a usage based relationship strength, and which results in an efficient and more accurate dynamic relationship association between informational items. This system comprises the steps and means for, respectively, detecting a selection of at least a first informational item and a second informational item in an information retrieval session. A relationship type is assigned based on characteristic similarities between the first informational item and the second informational item. Additionally, a relationship strength is assigned based on historical frequency of the consecutive selection of the first and second informational items and providing an access to the second informational item upon detection of the first being accessed by a user of the information retrieval system.

In addition, in accordance with the principles of the present invention, an information retrieval system comprises a plurality of informational items and a database having a relational association among at least two informational items of the plurality of informational items. The relational association includes respective relationship types and the relationship strengths. The relationship strength is based on historical frequency of at least two informational items being selected together in one information retrieval session.

Also, in accordance with the principles of the present invention, the extraction of textual database fields; the application of multiple text classification algorithms; the merging of the algorithm results; the encoding of the merged results as a Bayesian-type link; the use of feedback methods to weight, prune and age the relationship link serves to automate and enhance the process of classification in an information retrieval system.

It is also an object of this invention to provide a computer readable storage medium having stored thereon a computer program for implementing a method of providing related informational items that have a usage based relationship strength in an information retrieval system, the computer program comprising a set of instructions for detecting a selection of at least a first informational item and a second informational item in an information retrieval session, followed by an assignment of a relationship type based on characteristic similarities between the first informational item and the second informational item. The program also assigns a relationship strength based on historical frequency of the first informational item and the second informational item being selected together during a single information retrieval session. Additionally, the program provides access to the second informational item upon detection that the first informational item has been accessed by a user of the information retrieval system.

The computer readable storage medium may include various types of volatile and nonvolatile memory such as random access memory (RAM), read-only memory (ROM) and keep-alive memory (KAM). These "functional" descriptions of various types of volatile and on-volatile storage may be implemented by any number of known physical devises. The computer readable storage medium stores data representing instructions executable to implement the method for the information retrieval system according to the present invention.

DESCRIPTION OF DRAWINGS

Features and advantages of the present invention will become apparent to those skilled in the art from the following description with reference to the drawings, in which:

FIG. 2 is an exemplary table showing the relevant portions of the relationship database shown in FIG. 1;

FIG. 2A is an exemplary table showing one possible example of the contents of the table shown in FIG. 2;

FIG. 2B is an exemplary table showing a change in the contents of the table shown in FIG. 2A as a result of a user action;

FIG. 5 is an exemplary table showing the relevant portions of the relationship database shown in FIG. 1, as modified to include the help relationship type for the help information retrieval system in accordance with the principles of the present invention;

DETAILED DESCRIPTION OF PREFERRED EMBODIMENTS

For simplicity and illustrative purposes, the principles of the present invention are described by referring mainly to an exemplary embodiment, particularly, with references to the Internet and the WWW as the exemplary databases of informational items. However, one of ordinary skill in the art would readily recognize that the same principles are equally applicable to, and can be implemented in, other informational databases, and that any such variation would not depart from the true spirit and scope of the present invention.

An information retrieval system in accordance with the principles of the present invention allows a user to navigate through a plurality of informational items for a desired informational item, and upon selection of an information item, presents other informational items related to the selected informational item. The information retrieval system in accordance with the principles of the present invention maintains a database that defines a relational association between a plurality of informational items in the system.

The relational association is based on historical navigational behavior of users of the information retrieval system and includes a relationship type, which is based on the characteristic similarities between the informational items and relationship strength. These similarities are based on the historical frequency of any related informational items being selected by a user within the same information retrieval session.

When a navigation from one informational item to another item is detected, the relationship type and the relationship strength of the two informational items are determined and stored in a database. During a subsequent selection of an informational item, any informational items related to the selected informational item may be presented to the user, sorted based on the respective relationship types and relationship strengths, and may be provided in a sorted list from which the user can select.

In an aspect of the present invention, the informational retrieval system is utilized in a help information retrieval system to provide a dynamic context sensitive mapping of help informational items.

Figure 1:
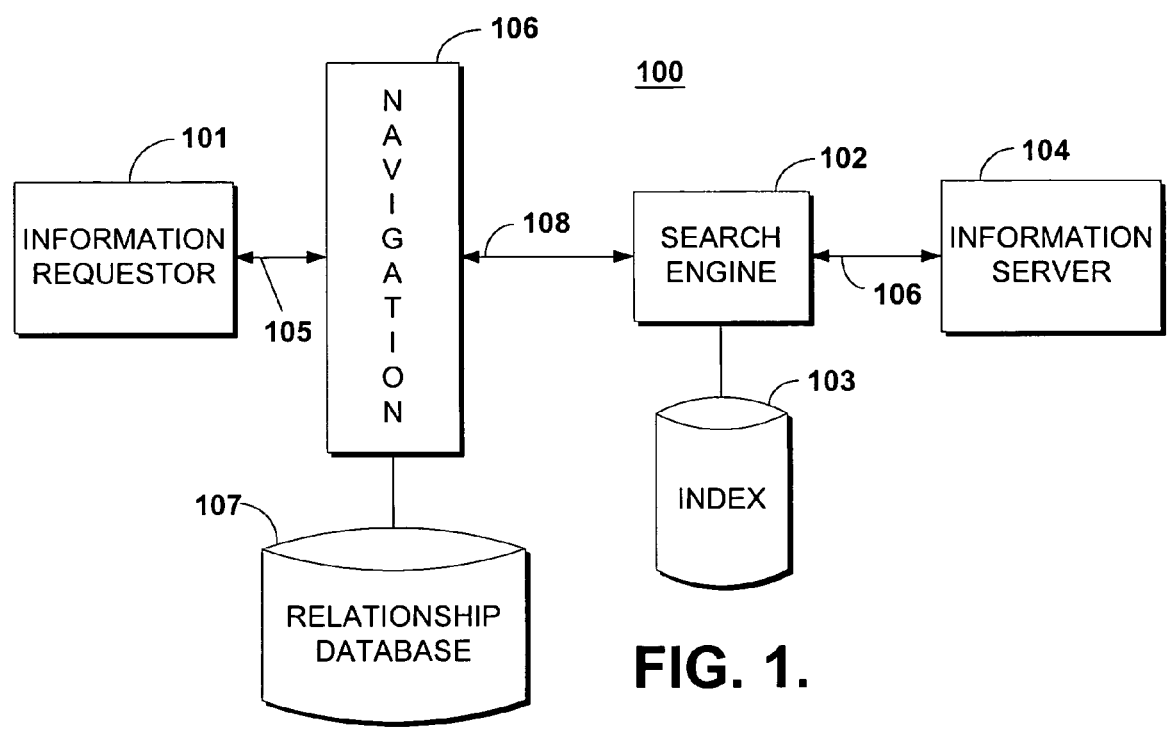
FIG. 1 is an exemplary block diagram of the information retrieval system in accordance with the principals of the present invention.

In particular, FIG. 1 shows an illustrative embodiment of the information retrieval system 100 in accordance with the principles of the present invention, which may comprise, in relevant part, inter alia, an information requester 101, a navigation interface/server 106, a search engine 102 and an information server 104. The information retrieval system 100 may be any system in which a plurality of informational items are available to be searched and retrieved. For example, the entire information retrieval system 100 may be housed within a single computer system, wherein the information server 104 may comprise a database containing a plurality of informational items stored in a mass storage device, e.g., a hard disk, and where the information requester 101 may be a user interface through which a user may initiate a search and retrieval session with the search engine 102. This in turn may be an application program running on the computer. In this example, the communication interfaces 105 and 108 may be the busses within the computer system.

Alternately, the information retrieval system 100 may even comprise a single computer program. In this case, each of the information server 104, information requestor 101 and the search engine 102 may comprise a sub-component of the single computer program and wherein, the communications interfaces 105 and 108 may themselves be computer routines acting as program interfaces.

In yet another alternative embodiment, the information retrieval system 100 may comprise a plurality of computers connected via a computer network. For example, the communication interfaces 105 and 108 may be a Wide Area Network (WAN), the Internet, the WWW, Public Switched Telephone Network (PSTN), or the like, through which each of the 5 information requester 101, the navigation interface 106, the search engine 102 and the information server 104 communicate. The information requester 101 may be, e.g., a personal computer connected to the Internet via a modem, or the like. The information server 104 may comprise a plurality of computers, e.g., web servers, distributed over the WAN 105, 108 or the Internet. The search engine 102 may comprise any currently available and known search engines, e.g., YAHOO™, EXCITE®, and the like, and may maintain an index 103 of a portion of the content of the WWW parsed into searchable words and corresponding locations. An example of a known search engine and the associated index may be found in U.S. Pat. No. 6,021,409 issued Feb. 1, 2000 to Michael Burrows, the entirety of which is hereby incorporated by reference herein.

Significantly, the information retrieval system 100 may further comprise a navigational interface 106 having a relationship database 107. The navigational interface 106 provides an interface between the information requester 101 and the rest of the information retrieval system 100 that may comprise a server, e.g., one or more computers. This allows the information requester 101 to establish an information retrieval session, and to navigate through the various informational items in the information retrieval system 100. A navigation refers herein to generally the process of selecting and viewing one or more informational items.

Alternatively, the navigational interface 106 and/or the relationship database 107 may be implemented as a part of the user interface, e.g., a web browser, of the information requester 101, or even as a part of the search engine 102.

FIG. 2 shows an exemplary table illustrating the relevant portions 200 of the relationship database 107. The relationship database 107, in accordance with one aspect of the present invention, comprises, inter alia, an informational item field 201 that uniquely identifies information items INFO Item 1 to INFO Item N, which may preferably be the location pointers, e.g. the URL in the case of WWW pages or in the case of actual informational items, a related informational item field 202. A related informational item field 202 may contain one or more informational items, e.g., INFO Item A to INFO Item Z, that are related to an informational item in the informational item field 201.

The relationship database 107 may further comprise a relationship type field 203. This field defines the similarities between the respective characteristics of the informational items that are related. Another field in the database 107 is a relationship strength field 204, which indicates the strength of the relationships between a pair of informational items based on the historical frequency of the pair being selected by a user during a single information retrieval session. In a preferred embodiment of the present invention, the relationship strength 204 comprises a value indicator represented as an integer, e.g. 1, 2, 4, etc.

According to the principles of the present invention, a related informational item record in the table 200 is created when at least two informational items are selected by a user during an information retrieval session. For example, during an information retrieval session, the user has navigated through informational items, INFO ITEM 1, INFO ITEM A and INFO ITEM B, a relational record for each of the pairs, INFO ITEM 1/INFO ITEM A, INFO ITEM 1/INFO ITEM B and INFO ITEM A/INFO ITEM B, may be created if the respective records do not already exist in the database 107. Alternately, an embodiment of the present invention may create records only for information pairs which are selected consecutively, i.e., only for the pairs, INFO ITEM 1/INFO ITEM A and INFO ITEM 1/INFO ITEM B, in the proceeding example. Yet another alternative embodiment of the present invention may create records for any pair of informational items which are viewed during the information retrieval session. For example, a record may be created between the first and last informational items to indicate a relationship from the start of the session to the finish of the session.

The relationship type, by way of example only, may be in an information retrieval system comprising informational items regarding a book collection of a library; a common author; a common publisher and a common subject, or the like, shared by the related pair of informational items.

According to a preferred embodiment of the present invention, a "general" relationship type is provided, and whenever a pair of informational items are selected during an information retrieval session, a record for the general relationship type is always created in addition to the possible record with respect to the above described common trait relationship type.

The relationship strength may initially be assigned a value of, e.g., 1, the first time the record is created, and adjusted based on the subsequent frequency of the pair being selected together or adjusted on the basis of the number of simultaneously executed algorithms that find the existence or a relationship in an information retrieval session.

FIG. 2A shows an example of the contents of the table shown in FIG. 2. In this example, the informational item "Rose" has a number of informational items related thereto, i.e., the informational items, "Fire Truck", "Daisy" and "Shakespeare", which share some common traits. For example, the informational item "Rose" and the related information item "Fire Truck" are both red in color. The example also shows that the relationship strength of the informational item "Rose" and the related informational item "Fire Truck" sharing the same color red has a current relationship strength value of 4.

In operation, when a user selects an informational item, e.g., the information item "Rose" during an information retrieval session, the navigation interface 106 displays a list of informational items that are related to the selected informational item "Rose".

Figure 3:
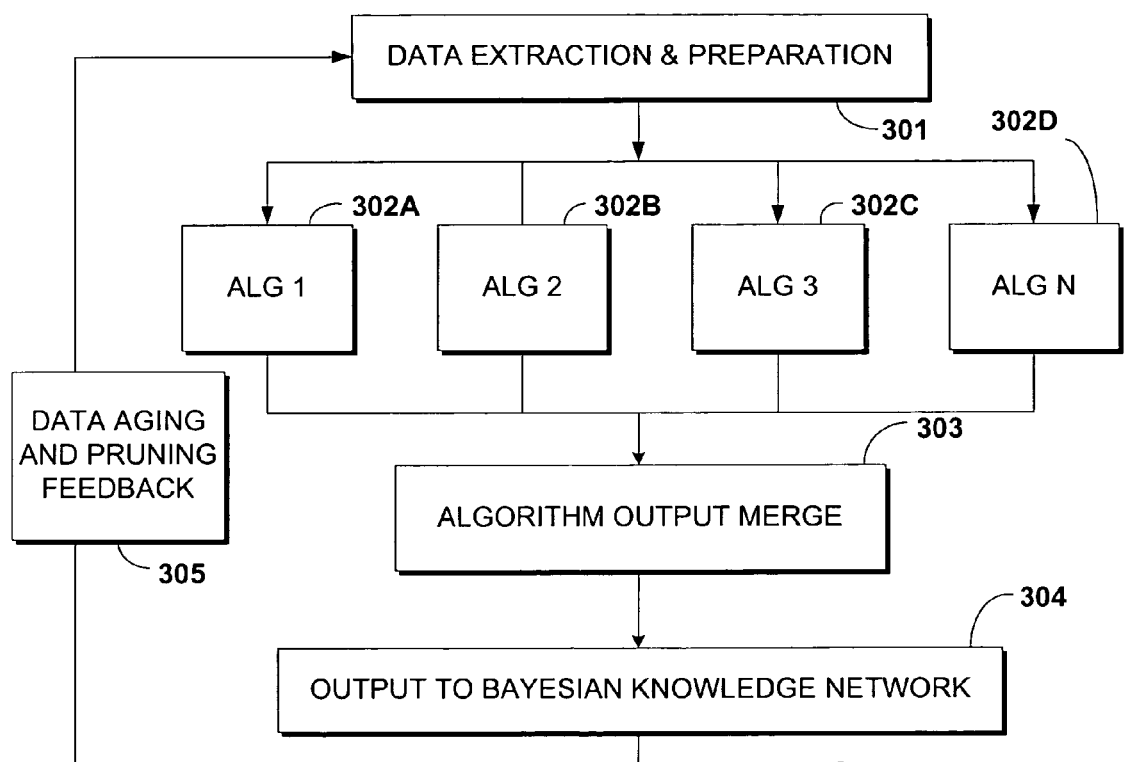
FIG. 3 is an exemplary block diagram of the present invention and its components.
Figure 4A:
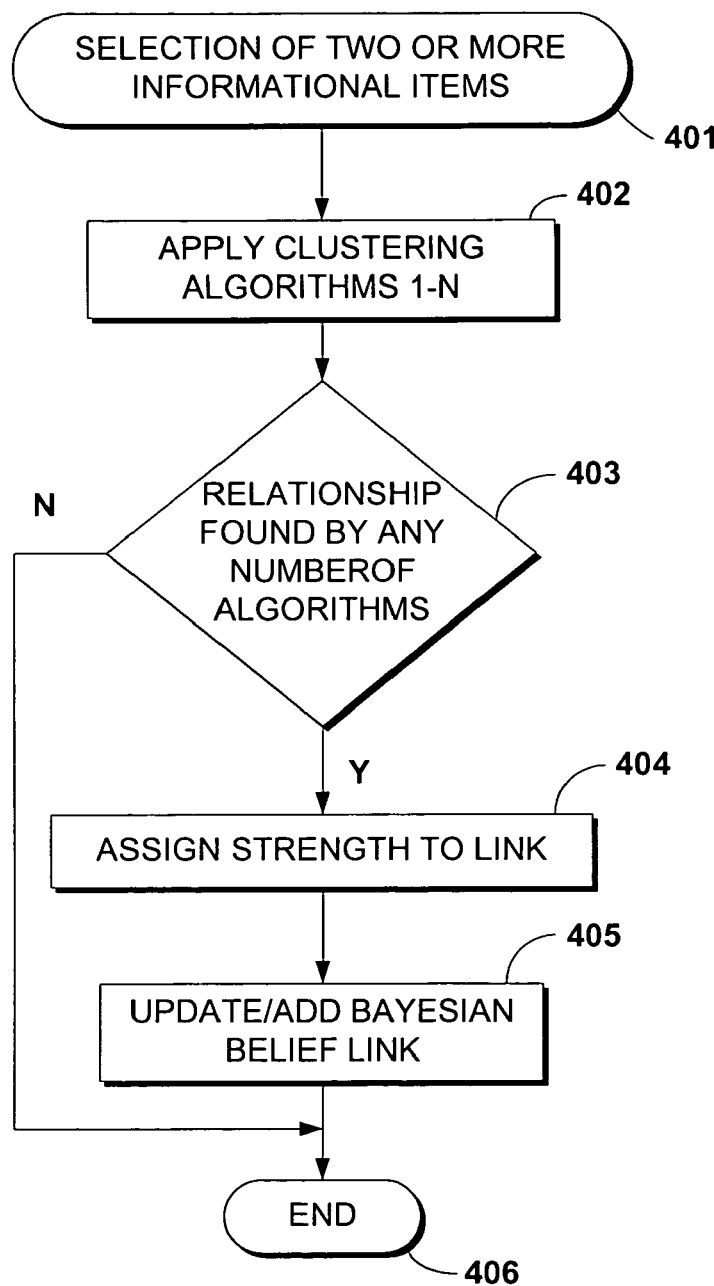
FIG. 4A is a flow diagram showing an exemplary embodiment of the related clustering merge and output to a Bayesian-type Network method in accordance with the principles of the present invention.

The inventive process of providing related informational items by the automated clustering of algorithm outputs into a Bayesian-type Network will now be described with references to FIGS. 3, 4A and 4B. The process is accomplished by feeding the output result of an information retrieval system into a Bayesian-type Belief Network and utilizing continuous feedback to fine tune the strength of the derived links between informational items. A traditional Bayesian Belief Network includes a set of random variables that make up the nodes of the network, a set of directed links that connect pairs of nodes, a conditional probability associated with each node to quantify the effect that parents have on a node and a directed acyclic graph i.e a graph with non directed cycles. By modifying the traditional Bayesian Belief Network, the present invention is able to automate and accurately classify relationships between informational items. In other words, the present invention incorporates a Bayesian-type Belief Network, which includes a set of random Frequently Asked Questions(FAQ) or Data, a set of relationships between nodes, a weight which describes the strength of relationship between each node, and a network structure which allows cycles and other structures with no limitations. Generally, as shown in FIG. 3, in step 301, the textual data relating to informational items are first extracted. A number of independent algorithms in steps 302A-302D, are applied to the two or more extracted informational items to determine the existence, if any, of a relationship link between the items. It should be noted that the number of individual algorithms 302 is open ended that is, there can be anywhere from 1 to N algorithms applied for the purpose of finding a relationship link. The output of the algorithms are first merged in step 303, and then fed into a Bayesian-type Knowledge Network in step 304. The merging of the algorithm outputs in step 303, initially serves the purpose of allowing a certain weight or strength value to be associated with a particular relationship link. The weight or strength assigned to a particular link is directly proportional to the total number of individual algorithms at step 302A-302D that determine the existence of a relationship link between individual informational items. A second purpose of the merged algorithm outputs is to enable the creation of a Bayesian-type link within a database. When a link has been created, the usefulness and relevance of the link must be periodically checked and updated in order to prevent wasteful storage and processing.

This usefulness checking and control mechanism is implemented by means of a data aging and pruning feedback process 305. The method of using feedback that results in data aging enhances the efficiency and effectiveness of the current invention. In general, the data-aging step involves an algorithm that runs as a function of traffic load to age relationship links according to their relevance. The purpose of this process is to keep the knowledge network current.

A further aspect of the present invention with the same ultimate goal, is the pruning process, which is also a part of the feedback step 305. Pruning of relationship links occurs following the second pass through of the data aging feedback process and results in the removal of irrelevant relationship links.

The particular steps for the clustering and output merging of the independent algorithms mentioned earlier, are depicted in FIG. 4A. In step 401, the present inventive navigational interface 106 detects a navigation from one informational item to at least one other informational item, e.g., from the informational item "Rose" to the informational item "Daisy", then to the informational item "Fire Truck".

In step 402, a cluster of algorithms is applied to determine if a relationship between the two or more informational items can be found.

In step 403, a determination is made whether any one or more algorithms detected a relationship for any of the ROSE/DAISY, ROSE/FIRE TRUCK and the DAISY/FIRE TRUCK pairs found in the database 107. If any of the informational items do not already have a relationship record in the database 403, a relationship type is determined for the missing pair. In an embodiment of the present invention, a record for each informational item pair with the "general" relationship type is created. In addition, a new record for each identified common trait of each pair is created. It is possible that a pair may have no common trait (e.g., the DAISY/FIRE TRUCK pair), in which case only the general relationship type record is created. It may also be possible that a pair may share more than one common trait (e.g., the ROSE/DAISY pair may share traits, "flower" and "scent").

In step 404, a determination is made of whether any relationships were found in the previous step 403. If there were no relationships found, then the process ends 408. Otherwise, in step 405, a determination is made whether the relationship has previously been pruned. If this link has never been pruned or is not currently pruned, a strength is assigned to the relationship link 406.

In step 406, for each newly created record, an initial value for the respective relationship weight is assigned, e.g., an initial value of 1. For example, if none of the pairs has an existing relationship record, then after the operations of steps 403 and 404, the resulting new records may be as shown in Table I below:

TABLE I

| Informational Item | Related Informational | Relationship Type | Relationship Strength |
|---|---|---|---|
| Rose | Fire truck | General | 1 |
| Rose | Fire truck | Red | 1 |
| Rose | Daisy | General | 1 |

TABLE I-continued

| Informational Item | Related Informational | Relationship Type | Relationship Strength |
|---|---|---|---|
| Rose | Daisy | Flower | 1 |
| Rose | Daisy | Scent | 1 |
| Daisy | Rose | General | 1 |
| Daisy | Rose | Flower | 1 |
| Daisy | Rose | Scent | 1 |
| Fire Truck | Rose | General | 1 |
| Fire Truck | Rose | Red | 1 |
| Daisy | Fire Truck | General | 1 |
| Fire Truck | Daisy | General | 1 |

In step 407, the Bayesian-type Network database 107 is updated to reflect the newly created records and/or the relationship strength(s) adjustment(s). In one embodiment of the present invention, the database 107 is updated in real time, whenever a new record is created or a relationship strength adjustment is made. In an alternative embodiment, the database may be updated off-line by collecting the navigational history of users of the information retrieval system in one or more history log file.

As can be appreciated, the relevant informational item provision system described above, provides an efficient and economical navigational tool by which a user of an information retrieval system may find a desired informational item with less effort and time. By suggesting related informational items which historically proved useful and by allowing the user to reap the benefits of the efforts that they or a prior user made during a prior information retrieval session, the effectiveness of the system is also enhanced.

Figure 4B:
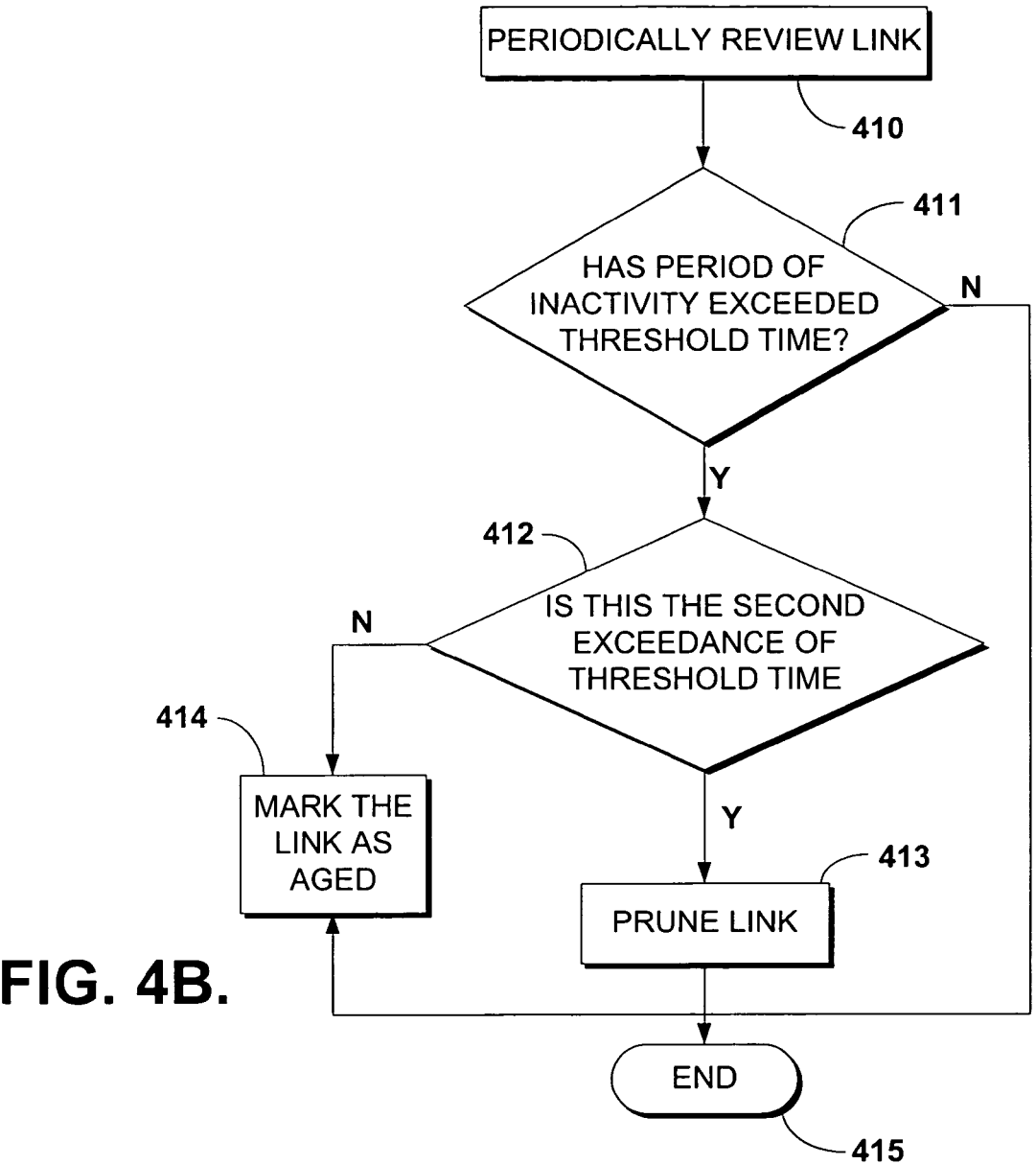
FIG. 4B is a flow diagram showing an exemplary embodiment of the related data aging and pruning method in accordance with the principles of the present invention.

FIG. 4B is an exemplary flow chart of the data aging and pruning process discussed earlier. This process both streamlines and enhances the quality of the information that is recorded in the database. As will be appreciated by one skilled in the art, the continuous collection and updating of data without any method for ensuring the relevance, reliability and usefulness of the data will result in a sluggish and cumbersome system. A process to overcome these problems is a feature of the present invention.

In one embodiment of the present invention, a periodic review of the established relationship links is conducted at step 410. Relationship link items that have not been utilized over a predefined threshold period 411 are marked as aged at step 412. When a particular link that was previously aged is determined to have no link i.e. link strength=0, as determined at step 414, the link is pruned at step 416, i.e. the record of that relationship link is removed from the database and at step 418 the link is marked as pruned, i.e. the link is placed in a separate table/list of unused links. It should be noted that the table/list of unused links is periodically purged from the system. This process is automatic and does not require any user initiation.

Figure 6:
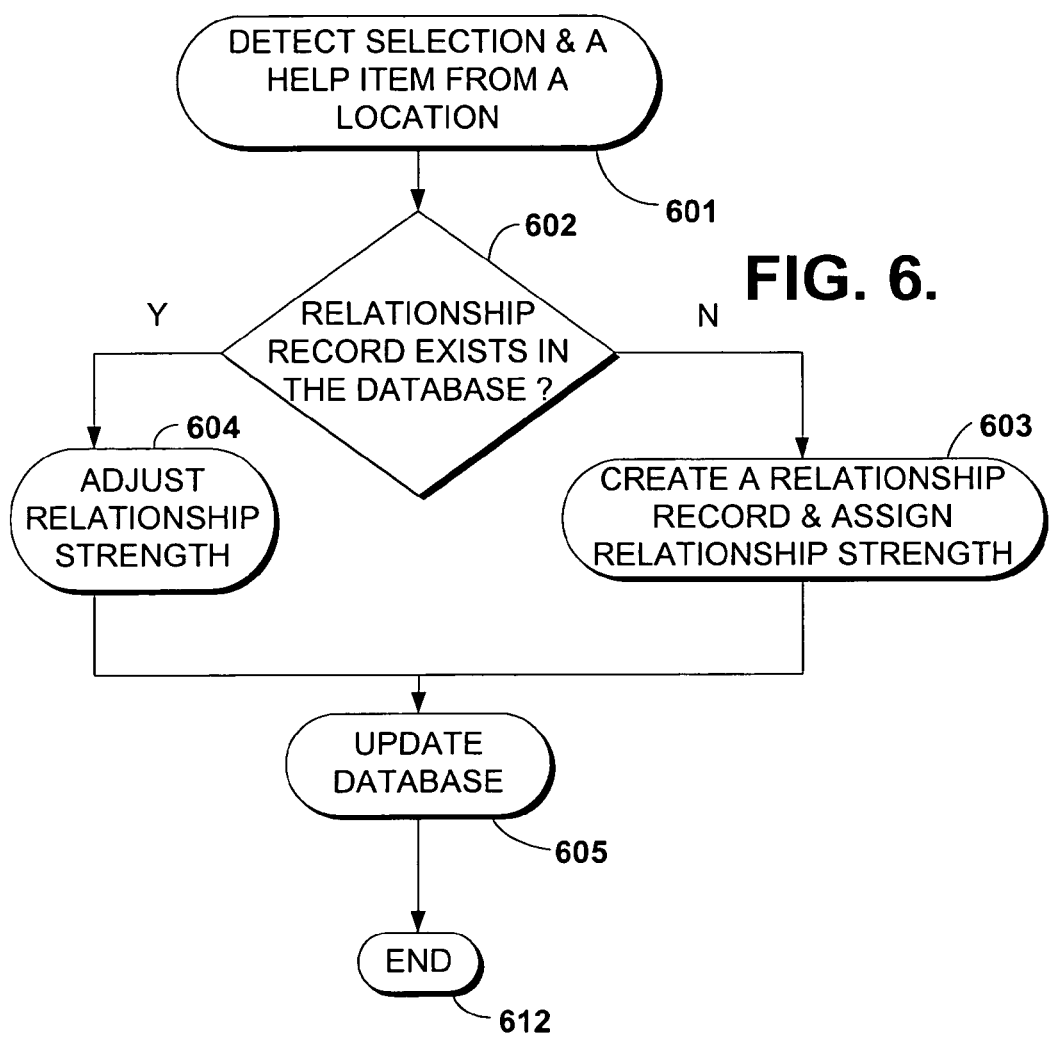
FIG. 6 is a flow diagram showing an exemplary embodiment of the related help information database update method in accordance with the principles of the present invention.

The process of providing context sensitive help items will now be described with references to FIGS. 6 and 7. As shown in FIG. 6, in step 601, the inventive help information retrieval system detects a selection of a help item, e.g., the help item INFO ITEM R, by a user during a help session, which was initiated when the user was viewing an informational item at a location, e.g., ITEM LOC N.

Upon the detection, in step 602, a determination is made of whether a help relationship record for the ITEM LOC N/INFO ITEM R pair already exists in the table 500. If the help relationship record does not already exist in the table, in step 603, a new help relationship record is created, and an initial value of the relationship strength therefore is assigned, e.g., the initial value is set to a one (1).

If, on the other hand, in step 602, a determination is made that the help relationship record already exists in the table, then, in step 604, the relationship strength for the existing record is increased by a predetermined amount, e.g., by 1.

In step 605, the table 500 is updated to reflect the newly created record and/or the relationship strength adjustment. In one embodiment of the present invention, the table 500 is updated in real time, i.e., whenever a new record is created or a relationship strength adjustment is made. In an alternative embodiment, the database may be updated off-line by collecting the help session history of users of the information retrieval system in one or more history log file. The history log file may be examined periodically, i.e., daily, monthly, etc., to determine the originating informational item(s) and any help item(s) selected to generate new relationship records and/or make relationship strength adjustments therefrom.

Figure 7:
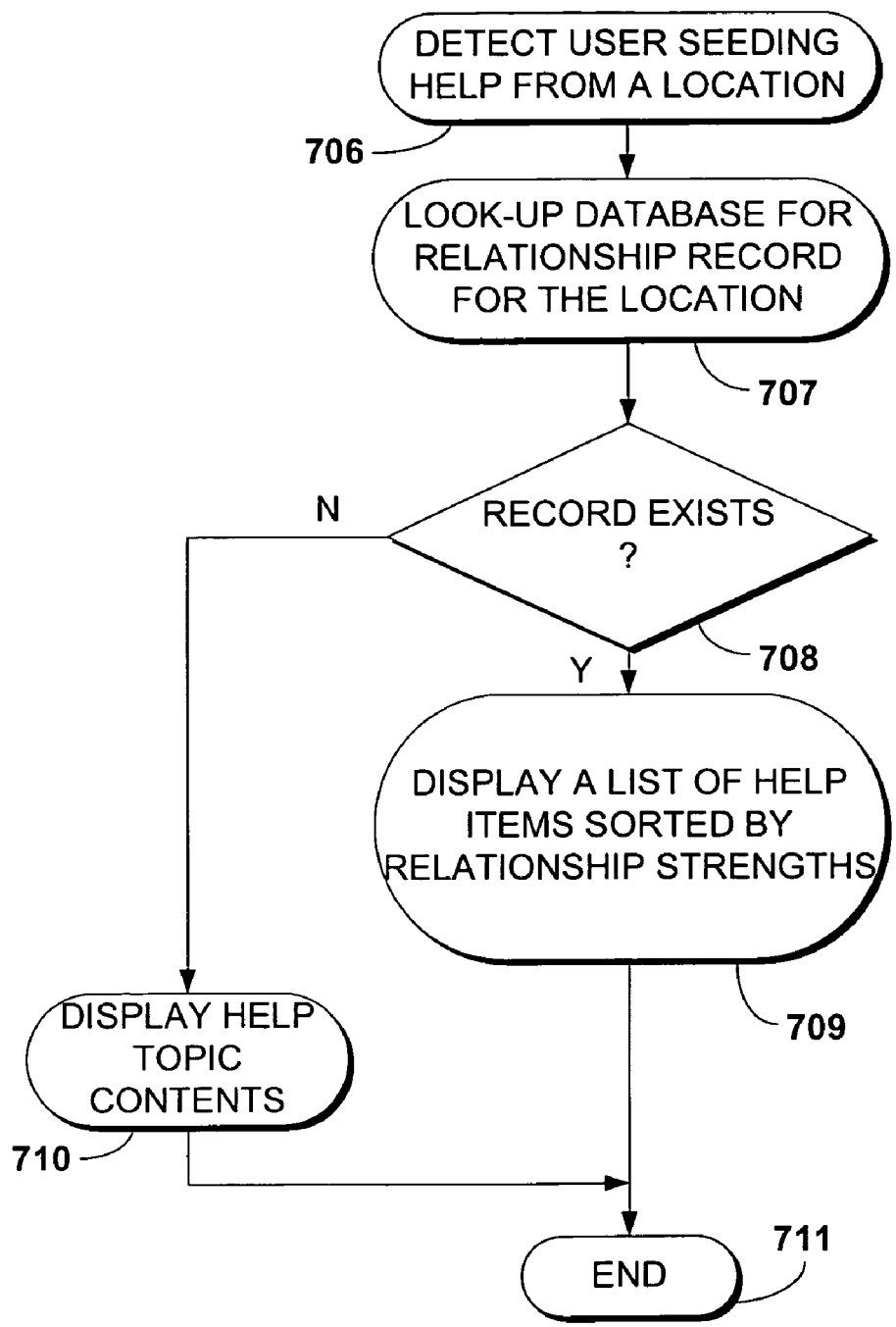
FIG. 7 is a flow diagram showing an exemplary embodiment of the related help information provision method in accordance with the principles of the present invention.

FIG. 7 shows an exemplary embodiment of the inventive related help information provision process. In this embodiment, when a user initiation of a help session is detected at step 706, the help information retrieval system of the present invention performs a look-up operation at step 707, of the table 500 to determine whether any help relationship records exist for the location corresponding to the informational item from which the help session originated. If a determination is made that one or more help relationship record(s) already exist (step 708) in the table 500, the matching help items are sorted (step 709) based on the relationship strengths, and may be displayed.

If, on the other hand, no help relationship record exists for the originating informational item location in the table 500, in step 710, a conventional help topic contents, as is well known, is provided for the user to select a help item therefrom. When the user selects a help item from the help topic contents, the selection is detected at step 601, and the location/info item pair of the originating informational item and the selected help item is processed through steps 602 to 605 to create and store a new help relationship record in the table 500.

As can be appreciated, this help information retrieval system described above allows a mapping of help items, which is sensitive to the context within which a user is seeking help, i.e., by providing originating location specific selection choices of help items. Moreover, the mapping is allowed to be dynamically updated based on the usage behavior to provide more relevant selection choices and thus a more efficient use of the help information retrieval system.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

We claim:

1. A computer readable storage medium having a computer program stored thereon for implementing a mapping method of classifying a plurality of informational items in an information retrieval system having a database, said computer program comprising a set of instructions for implementing said method comprising the steps of:

identifying a first informational item, wherein said first informational item includes one of a first frequently asked question or other data;

identifying a second informational item, wherein said second informational item includes one of a second frequently asked question or other data;

dynamically creating a general relationship field with initial integer weight values to define similarities of respective characteristics between said first informational item and said second informational item in an information retrieval session, wherein said field is used for representing an automated data item classification process;

integrating said classification process and said informational items with a combination of data aging and pruning feedback algorithms to produce a weighted output simulating a non-conventional Bayesian-type Belief Network;

detecting an access of said first informational item;

detecting an access of said second informational item;

establishing the presence or absence of a relationship link between said first informational item and said second informational item;

refining said initial integer weight values of said general relationship field associated with said first and second informational items based on a historical frequency of said relationship link being accessed by a user, wherein said initial integer weight values are changed as said frequency increases and on the prior presence or absence of said relationship link; and storing said weighted output being at least partially indicative of the classification of said informational items.

2. The computer readable storage medium as recited in claim 1 wherein said steps of identifying and detecting the second informational item includes identifying and detecting of a plurality of informational items.

3. The computer readable storage medium as recited in claim 2, further comprising the step of:

applying said algorithm for data aging wherein the usage of said relationship link is monitored and used as feed back for said initial integer weight value associated with said relationship link.

4. The computer readable storage medium as recited in claim 3, further comprising the step of:

applying said pruning algorithm wherein external information regarding the usefulness of at least one relationship link is utilized to modify said initial integer weight value or existence of a recorded relationship link.

5. The computer readable storage medium as recited in claim 4, wherein said pruning algorithm performs the removal of irrelevant relationship links subsequent to the data aging feedback process.

6. The computer readable storage medium as recited in claim 4, wherein said pruning algorithm makes use of a user determined feedback of the usefulness of a relationship link.

7. A computer readable storage medium having stored thereon a computer program for implementing a method of classifying a plurality of information items in an information retrieval system, said computer program comprising a set of instructions for implementing the steps recited in claim 2.

8. The computer readable storage medium according to claim 7, wherein said computer program further comprises one or more instructions for clustering the resulting output of said algorithms into a knowledge network.

9. The computer readable storage medium according to claim 7, wherein said computer program further comprises one or more instructions for improving the usefulness of said relationship links through weighting of said relationship links.

10. The computer readable storage medium according to claim 7, wherein said computer program further comprises one or more instructions for improving the usefulness of said relationship links through pruning of said relationship links.

11. The computer readable storage medium according to claim 7, wherein said computer program further comprises one or more instructions for improving the usefulness of said relationship links through aging of said relationship links.

12. The computer readable storage medium according to claim 7, wherein said computer program further comprises one or more instructions for improving the usefulness of said relationship links through weighting, pruning and aging of said relationship links.

13. The computer readable storage medium as recited in claim 2, wherein said plurality of algorithms are used and wherein said initial integer weight value of said relationship link is adjusted in direct proportion to the number of said algorithms used to determine the existence of said relationship link.

14. The computer readable storage medium as recited in claim 2, wherein said relationship link is positioned in a list in direct proportion to the degree of consensus among said algorithms.

15. The computer readable storage medium as recited in claim 2, wherein each algorithm used runs independently of all other algorithms.

16. The computer readable storage medium as recited in claim 2, further comprising the step of merging the outputs of said algorithms.

17. The computer readable storage medium as recited in claim 2, further comprising the step of recording said relationship link in said non Bayesian-type Belief Network.

18. The computer readable storage medium as recited in claim 3, wherein said algorithm for data aging runs as a function of traffic load to age the relationship links according to relevance of the relationship links.

19. A computer readable storage medium having a computer program stored thereon for providing classification of informational items in an information retrieval system having a database, said computer program having a network structure which allows cycles comprising:
  means for detecting the access of informational items, wherein said informational items include one of a frequently asked question or other data;
  means for dynamically creating a general relationship field with initial integer weight values to define similarities of respective characteristics between a first informational item and a second informational item in an information retrieval session, wherein said field is used for representing an automated data item classification process;
  means for integrating said data item classification process and said informational items with the combination of data aging and pruning feedback algorithms to produce a weighted output simulating a non-conventional Bayesian-type Belief Network;
  means for establishing the presence or absence of relationship links between said informational items to enhance the effectiveness of said information retrieval system;
  means for refining said initial integer weight values of said general relationship field associated with said informational items based on a historical frequency of said relationship links being accessed by a user, wherein said initial integer weight values are changed as said frequency increases and on the prior presence or absence of said relationship links;
  means for storing said relationship links and said weighted outputs.

20. The computer readable storage medium of claim 19 including:
  means for aging said relationship links; and
  means for pruning said relationship links.

21. The computer readable storage medium of claim 20 including means for merging the resulting output of said algorithms into a knowledge network.

22. A computer readable storage medium having a computer program stored thereon for implementing a mapping method of classifying a plurality of informational items in an information retrieval system having a database, said computer program comprising a set of instructions for implementing said method comprising the steps of:
  detecting an access of a first informational item, wherein said first informational item includes one of a frequently asked question or other data;
  detecting an access of a second informational item, wherein said second informational item includes one of a frequently asked question or other data;
  establishing the presence or absence of a relationship link between said first informational item and said second informational item;
  dynamically creating a general relationship field with initial integer weight values to define similarities of respective characteristics between said first informational item and said second informational item in an information retrieval session, wherein said field is used for representing an automated data item classification process;
  integrating said classification process and said informational items with the combination of data aging and pruning feedback algorithms to produce a weighted output simulating a non-conventional Bayesian-type Belief Network;
  refining said initial integer weight values of said general relationship field associated with said first and second informational items based on a historical frequency of said relationship link being accessed by a user, wherein said initial integer weight values are changes as said frequency increases and on the prior presence or absence of said relationship link; and
  storing said weighted output being at least partially indicative of the classification of said informational items.

* * * * *

UNITED STATES PATENT AND TRADEMARK OFFICE
CERTIFICATE OF CORRECTION

PATENT NO. : 7,730,072 B2  Page 1 of 1
APPLICATION NO. : 09/751934
DATED : June 1, 2010
INVENTOR(S) : James Neal Richter et al.

It is certified that error appears in the above-identified patent and that said Letters Patent is hereby corrected as shown below:

On the Title Page Item (73) Assignee:

delete "Rightnow Technologies, Inc., Bozeman, MT (US)" and replace with "RightNow Technologies, Inc., Bozeman, MT (US)"

Signed and Sealed this

Twenty-fourth Day of August, 2010

David J. Kappos
*Director of the United States Patent and Trademark Office*